United States Patent

[11] 3,602,909

[72] Inventor Ronald L. Swanson
Exton, Pa.
[21] Appl. No. 876,965
[22] Filed Nov. 14, 1969
[45] Patented Aug. 31, 1971
[73] Assignee Burroughs Corporation
Detroit, Mich.

[54] AVAILABLE SHIFT-REGISTER COUNT MODIFIER
6 Claims, 2 Drawing Figs.

[52] U.S. Cl. .......... 340/174 SR, 340/174 AC
[51] Int. Cl. .......... G11c 19/00
[50] Field of Search .......... 340/174 SR; 307/88 R

[56] References Cited
UNITED STATES PATENTS 2,852,699 9/1958 Ruhman .......... 307/88
2,980,803 4/1961 Guterman .......... 307/88
3,241,119 3/1966 Rising et al. .......... 340/174 X

*Primary Examiner*—Stanley M. Urynowicz, Jr.
*Attorney*—Charles S. Hall

ABSTRACT: An available count modifier for a multistage, magnetic-core shift register. A gating circuit is provided to determine the presence of a binary ONE in the first stage of the register and a binary ZERO in all stages intervening between the first stage and a selected subsequent stage of the register. A magnetic detect core responds to the gating condition to prevent the binary ONE in the first stage from propagating through the register and to insert a binary ONE in the selected subsequent stage of the register, thereby effectively decreasing the number of stages in the register. In a modified embodiment a gating circuit is provided to detect the presence of a binary ONE in the first stage and a binary ZERO in the stages intervening between the second stage and the selected subsequent stage.

INVENTOR.
RONALD L. SWANSON
BY Charles E. Quarton
AGENT

AVAILABLE SHIFT-REGISTER COUNT MODIFIER

BACKGROUND OF THE INVENTION

The invention generally relates to an intelligence storage device for receiving binary data in digital and computing circuits. Particularly, the invention relates to a magnetic-core shift register (MSR) having a plurality of stages and circuitry for decreasing the effective number of stages in the register thereby modifying the available count of the register.

In the prior art, shift registers are reset to a desired modified count by using an additional current driver to cause the stages to assume a particular count. Typically, a vacuum tube, thyratron or transistor current driver is used to supply the necessary high current to activate the magnetic cores of the register.

A problem with these current drivers is that they are relatively expensive when compared to magnetic cores and sensitive to the extreme environmental conditions encountered in many applications. Also, the life of the active elements in a current driver is considerably less than that of a magnetic core. Thus, the current driver is a weak link in magnetic-core systems and it is desirable to minimize the usage of current drivers.

Therefore, an object of the invention is to simplify available count modifiers for a magnetic-core shift register by eliminating the need for additional current drivers.

Another object of the invention is to provide an available count modifier for a magnetic-core shift register utilizing elements insensitive to environmental extremes and having a long life cycle.

SUMMARY OF THE INVENTION

The invention includes a multistage shift register comprising a plurality of magnetic cores, one for each of the stages. The stages are coupled together with a delay network which provides a temporary storage for data read from a core so that writing of data into succeeding core can be delayed until the succeeding core has been cleared by the read action of shift transfer command. Gating circuitry is coupled to the stages of the shift register to determine the existence of a count-modifying condition comprising a binary ONE in the first stage of the register and a binary ZERO in all the stages of the register intervening between the first stage and a selected subsequent stage. Upon occurrence of the count-modifying condition, a first shift command causes a detect core which normally remains in the ZERO state to be set to the ONE state, and causes the shift of the ONE from the first to the second stage. In a modified embodiment of the invention gating circuitry is provided to detect the condition of a binary ONE in the first stage and a binary ZERO in the stages intervening between the second stage and the selected subsequent stage.

On the second shift command the one output of the detect core is applied to an input of the third stage of the register to cancel the ONE output of the second stage and thereby prevent further transfer of information to succeeding stages. Also, the detect core output is connected to an input of the selected succeeding stage of the register to write the ONE output of the detect core into the selected stage. Therefore, the stages of the register between the second stage and the selected subsequent stage are effectively shorted out resulting in a reduced available count in the shift register. The use of the detect core eliminates the need for an additional driver circuit to set the selected core and to cancel the signal propagation from the second stage.

These and other aspects of the present invention will become more obvious from the following detailed description taken in connection with the accompanying drawing which shows the invention in which.

Figure 1:
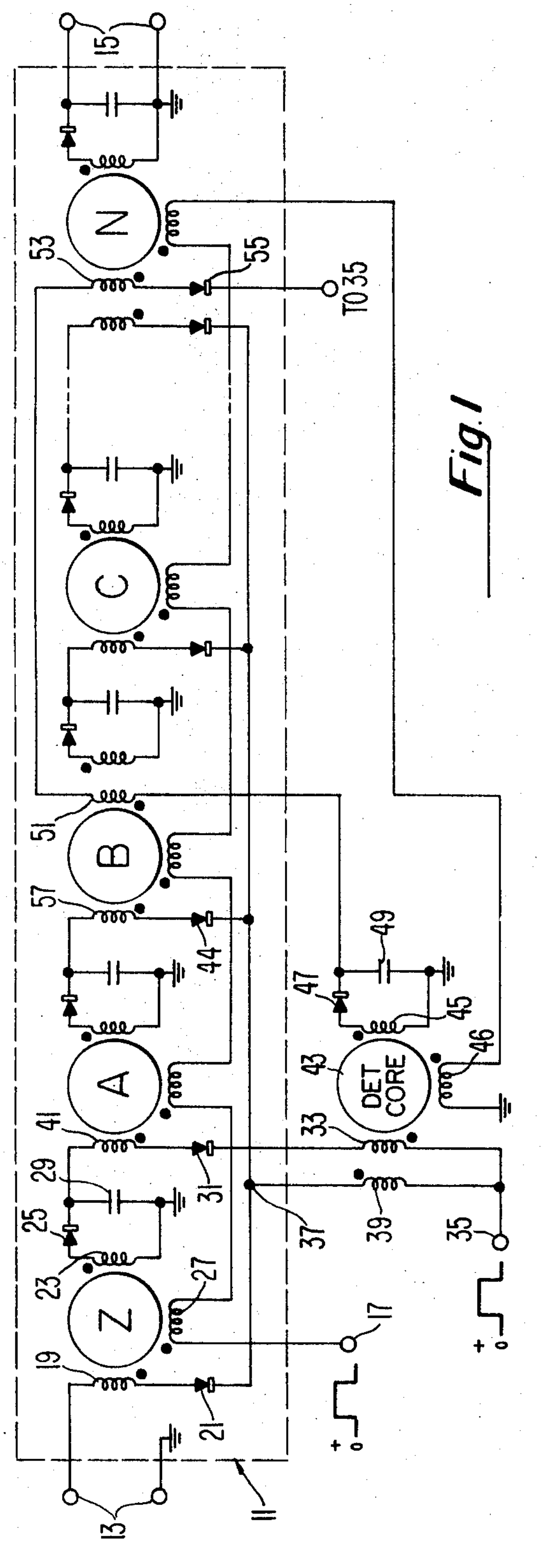
FIG. 1 is a detailed circuit diagram showing a magnetic-core shift register incorporating one embodiment of applicant's available count modifier.

Referring now to FIG. 1, a multistage magnetic-core shift register 11 is provided for storing binary information. The register receives an input at the input terminals 13 and provides an output at the output terminals 15. A shift transfer command is applied at conductor 17. The register utilizes delay parallel magnetic pulse amplifiers arranged in an input-disconnect circuit having a common return. The magnetic cores in the MSR are designated Z,A,B,C—to N and any number of cores can be used depending on the maximum number of stages needed in a given application, as indicated by the broken line preceding core N.

Magnetic core Z, the input cure, has an input winding 19 in series with an input diode 21 for writing information into the core, an output winding 23 in series with an output diode 25, and a read winding 27. A delay capacitor 29 is provided across the output winding 23 and diode 25 to ground for delaying signal propagation to succeeding core A. Each of the other cores in the MSR similarly has an input and an output diode, a delay capacitor and input, output and read windings, all of the read windings of the cores being connected in series. The serially connected read windings of the cores are simultaneously supplied with a positive drive current pulse at the conductor 17 from a conventional driver (not shown) to effect a transfer of information in the register.

In accordance with standard convention, a magnetic core is set to the ZERO state when a voltage is impressed across the input winding so that the dot end of the winding is positive with respect to the nondot end of the winding and is set to the ONE state when the impressed voltage is such that the dot end is negative with respect to the nondot end of the input winding. When the core switches toward the ZERO state, a voltage is induced across all the windings of the core so that the dot ends of the windings are positive with respect to the nondot ends and when the core switches toward the ONE state a voltage is induced across all the windings so that the dot ends are negative with respect to the nondot ends.

The read current pulse is a positive current which upon application to the read windings of the magnetic cores causes the cores to switch toward the ZERO state of the magnetic core contains a ONE and thereby induce a positive voltage at the dot end of the output winding. If a magnetic core contains a ZERO the core does not switch but remains in the ZERO state and no voltage is induced in the output winding of the core.

The setting of core Z to the ONE state induces a voltage on the output windings 23 which is relatively negative at the anode of the output diode 25. Therefore, the output diode 25 of core Z is reverse biased when a ONE is written into core Z. When a positive read pulse is applied to the dot end of read winding 27, the core Z will switch toward the ZERO state inducing a positive voltage at the anode of the output diode 25 and the diode will be forward biased. Thus, the output diode serves to prevent a pulse transfer to the delay capacitor 29 in response to a write action and allows transfer of a pulse in response to a read action.

Magnetic cores cannot be subjected to a write action and a read action simultaneously. Therefore, the delay capacitor 29 provides a temporary storage for information read from core Z so that writing into succeeding core A can be delayed until core A has been cleared by a read action. Each output of the cores in the MSR is coupled to the input of the succeeding core with a delay capacitor in a similar manner.

As previously mentioned, each of the cores in the MSR has an input diode serially connected with its input winding. The input of diode 31 of core A is connected by winding 33 of detect core 43 to input-disconnect terminal 35. Each of the input diodes in series with the input windings of the other cores is connected to node 37. This node is then connected by the winding 39 of detect core 43 to input-disconnect terminal 35. A positive bias pulse is applied to the input-disconnect terminal 35 during the read action to reverse bias each of the input diodes of the cores and isolate the cores from one another as known in the art. The positive pulse can be derived from the source controlling the drive pulse or from the drive pulse itself. This input-disconnect circuit serves to reduce power losses caused by the load of the back loop during read if the input winding is not disconnected. Also, the interaction between neighboring cores of a register, which causes variable circuit behavior depending upon the states of the neighboring cores, is eliminated.

In order to understand the operation of the MSR, assume that a ONE is set in core Z. During the application of a read drive current pulse to conductor 17 a ONE is read by the output winding 23 and the delay capacitor 29 is charged. At the same time the drive pulse is applied, a positive bias voltage is applied to the input-disconnect terminal 35 and on through to the cathode of the input diode 31 rendering the diode nonconducting. At the end of the drive pulse period the delay capacitor 29 is fully charged. The positive bias voltage on input diode 31 is then removed, permitting the delay capacitor 29 to discharge through the diode and the input winding 41 of core A. Current passing through the input winding 41 then writes a ONE IN CORE A. If a ZERO is set in core Z a ZERO will be read by the output winding 23 and core A will remain in the ZERO state induced by the read drive current pulse in the read winding. The other stages in the MSR operate in the same manner.

When using a shift register as a shift code counter, it is desirable to be able to bypass a portion of the stages and thereby reduce the available count of the shift register. In order to modify the available count a detect core 43 is provided incorporating windings 33 and 39 referred to above. Winding 33 serves as one input to detect core 43 and is connected to the input winding 41 of core A. The second input winding 39 of the detect core is arranged in opposition to winding 33, as is shown by the dot convention of the two windings, and is connected to node 37. All the input windings of the cores of the register 11 except the input winding 41 of core A and an auxiliary winding 53 of core N, will transfer a write pulse discharge indicating the presence of a ONE through the second input winding 39 of the detect core and thereby set the detect core to a ZERO state. If the input winding 33 of the detect core also receives a discharge from the input winding 41 of core A, indicating the presence of a ONE in core Z, then the magnetic flux produced by the first input winding is opposite the magnetic flux produced by the second input winding and the two fluxes will cancel leaving the detect core in the ZERO state set by the read winding. However, when core Z is in the ONE state and all other cores intervening between core Z and core N are in the ZERO state there will only be a write pulse discharge in the input winding 41 of core A and the detect core will be written to the ONE state. Thus, the windings of the detect core are connected to operate as a gating means to set the detect core to the ONE state only upon the existence of the modifying condition of a ONE in the first core and a ZERO in all cores of the register intervening between the first core and core N.

Figure 2:
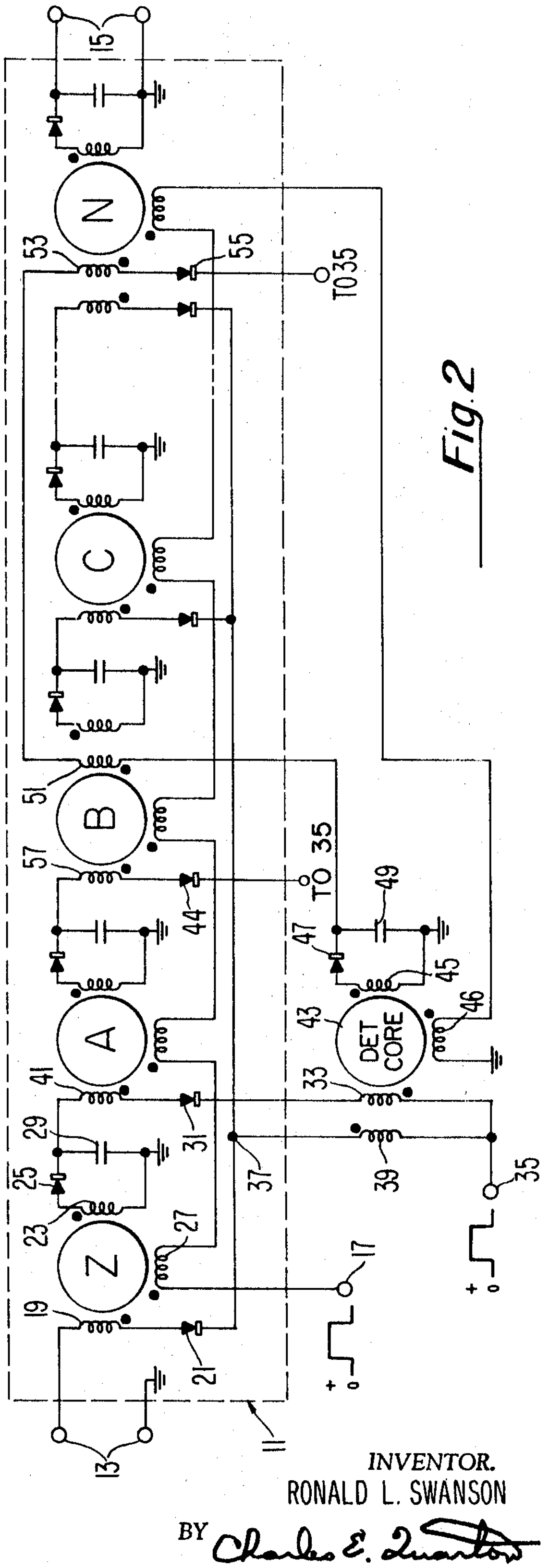
FIG. 2 is a detailed circuit diagram of a modification of the available count modifier of FIG. 1.

If a difference modifying condition is desired, then the delay capacitors can be rearranged to discharge through the windings 33 and 39 in a manner to set the detect core to the ONE state only upon the occurrence of the desired condition. For example, as shown in FIG. 2, if the desired modifying condition is a ONE STATE IN CORE Z, either a ONE state or a ZERO state in core A and a ZERO state in all cores intervening between core A and core N, then the input diode 44 of core B would not be connected to node 37 but would be connected to the input-disconnect terminal 35. All the other connections of the modification of FIG. 2 are the same as in the embodiment of FIG. 1 and the same numbers indicate the same parts. In this modifying condition the state of core A is immaterial. It is apparent that the detect core can be made to respond to any desired modifying condition.

Detect core 43 has a read winding 46 serially connected with the read windings of the MSR 11 for receiving shift commands through conductor 17. The output winding 45 of the detect core 43 is serially connected with an output diode 47 to provide isolation from voltages induced by a write action. A delay capacitor 49 is charged by the output winding when a ONE is read out of the detect core. The delay capacitor 49 simultaneously discharges through an inhibit winding 51 of core B and through an auxiliary input winding 53 of core N. The auxiliary input winding 53 is connected in series with a diode 55 which is in turn connected to input-disconnect terminal 35.

The inhibit winding 51 will produce a magnetic flux in core B which is opposite the magnetic flux produced by a write ONE action on input winding 57 and thereby cancel a ONE which is written into core B. Also, the discharge through the input winding 53 of core N by the delay capacitor 49 will write a ONE in succeeding core N. The result of cancelling the write ONE in core B and writing a ONE in core N is that the intervening magnetic cores of the register have been effectively shorted out and the available count of the shift register has been reduced. It is apparent that any succeeding core, not just core N, can be selected for setting to the ONE state. Conventional switching circuits can be used to perform the selection of an auxiliary input winding of any succeeding core, if desired.

Assume now, in order to understand the operation of the circuit, that the modifying condition of the illustrated example in FIG. 1 exists and the shift register has a ONE in core Z and a ZERO in all cores intervening between core Z and core N. Upon the first shift transfer a ONE will be transferred from core Z to core A and the detect core will be set to a ONE. Any incoming information will also be written into core Z. Upon the second shift transfer core A will attempt to write a ONE into core B, but the ONE output of the detect core will inhibit the ONE output of core A from setting core B and will write a ONE into selected succeeding core N. Therefore, the detect core will operate to prevent propagation of the ONE from core A and will write a ONE into a selected succeeding core, in this case core N, thereby effectively bypassing the cores intervening between core A and core N and modifying the available count in the shift register.

The embodiment of FIG. 2 operates in a manner similar to the operation of the embodiment of FIG. 1. A difference in operation results if both core Z and core A are set in the binary ONE state as a result of two consecutive transfers of a ONE into the input of core Z while the cores intervening between core A and core N are in the ZERO state. In this condition, the embodiment of FIG. 2 operates to transfer the ONE in core Z to the selected succeeding core, core N, since the detect core will be set. However, in the embodiment of FIG. 1 the detect core would not be set since there is a ONE in core B. In all other cases the FIG. 2 embodiment will operate in the same manner as the embodiment of FIG. 1.

In view of the disclosure it is apparent that the detect core can be used to inhibit more than one of the cores in the MSR and/or to set more than one subsequent core if this should be desired in the environment in which the invention is utilized.

What is claimed is;

1. A method of modifying the available count in a shift register having a plurality of magnetic cores, arranged as successive stages and each having at least two stable states, upon the occurrence of a predetermined combination of stable states in said register including a given stable state in one of said cores and a different stable state in a selected succeeding core comprising the steps of:

generating an auxiliary control flux upon the first shift command to said register after the occurrence of said predetermined combination and applying a modifying flux to said register in response to the second shift command after the occurrence of said predetermined combination to cancel the propogation of said given stable state and to change the stable state of said selected succeeding core to a different stable state, said modifying flux being a function of said auxiliary control flux.

2. A digital information transfer system having an available count modifier comprising:

a shift register having a plurality of serially connected magnetic cores including an input core, each of said cores having at least two stable states;

a magnetic detect core having at least two stable states, means for interrogating the state of each of the cores in said register and setting said detect core to a selected stable state upon occurrence of a predetermined count-modifying condition; and modifying means responsive to the selected state condition of said detect core and coupled to said register, for preventing information propagation in said register and for setting a selected succeeding core in said register to a given stable state.

3. The system of claim 2 wherein the interrogating means includes a pair of windings coupled to said detect core to produce opposing flux in said detect core, one of said windings being coupled to at least one of the cores in said register and the other of said windings being coupled to at least one of the remaining magnetic cores in said register.

4. The system of claim 2 wherein said count-modifying condition comprises a binary ONE state in said input core and a binary ZERO state in all the magnetic cores of said register intervening between said input core and said selected succeeding core.

5. The system of claim 4 wherein the means for interrogating sets said detect core to a binary ONE state, and the modifying means sets said selected core to a binary ONE state.

6. The system of claim 2 wherein said count-modifying condition comprises a binary ONE state in said input core and a binary ZERO state in all the magnetic cores of said register intervening between the next higher order magnetic core, adjacent said input core, and said selected succeeding core.